(12) United States Patent
Scott et al.

(10) Patent No.: US 9,584,961 B2
(45) Date of Patent: Feb. 28, 2017

(54) METHODS AND SYSTEMS FOR SERVICE TRANSFER

(71) Applicant: Comcast Cable Communications, LLC, Philadelphia, PA (US)

(72) Inventors: Jim Scott, West Chester, PA (US); Richard Hertz, Collingswood, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/274,841

(22) Filed: May 12, 2014

(65) Prior Publication Data

US 2015/0327213 A1 Nov. 12, 2015

(51) Int. Cl.
*H04W 4/02* (2009.01)
*H04W 64/00* (2009.01)
*H04L 29/08* (2006.01)

(52) U.S. Cl.
CPC .............. *H04W 4/02* (2013.01); *H04L 29/08* (2013.01); *H04W 4/026* (2013.01); *H04W 4/027* (2013.01); *H04W 64/006* (2013.01)

(58) Field of Classification Search
CPC ..................................... H04W 64/00

USPC .......................................... 455/456.1–456.6
See application file for complete search history.

(56) References Cited

U.S. PATENT DOCUMENTS

| | | | |
|---|---|---|---|
| 2004/0192206 A1* | 9/2004 | Hirvonen ............... | H04W 48/18 455/41.2 |
| 2009/0054077 A1* | 2/2009 | Gauthier et al. ........... | 455/456.1 |
| 2013/0130712 A1* | 5/2013 | Karasudani ............... | 455/456.1 |
| 2013/0204939 A1* | 8/2013 | Yajima .................... | H04W 8/24 709/204 |

\* cited by examiner

*Primary Examiner* — Michael T Vu
(74) *Attorney, Agent, or Firm* — Ballard Spahr LLP

(57) ABSTRACT

Methods and systems for service transfer are disclosed. An example method can comprise receiving a service at a first/current user device, detecting a movement of the first user device, determining a direction of the movement, and requesting the service be provided to a second/target user device in the direction of the movement. Service can be a communication session, network access, video service, audio service, short message service, multimedia message service, and the like. The movement of a user device can be detected by one or more sensors implemented in the user device. For example, to enable a service transfer, a user can point the first user device to a second user device. The pointing can be achieved, for example, by moving the first user device to the direction of the second user device at certain speed.

20 Claims, 9 Drawing Sheets

METHODS AND SYSTEMS FOR SERVICE TRANSFER

BACKGROUND

Current network technology enables service consumption through different user devices. Service can be transferred from one user device to another, for example, television content can be directed from a television to a desktop computer or from a mobile phone to a laptop. Users can direct the transfer of service between user devices according to a transfer protocol. However, transfer protocols can involve lengthy procedures. There is a need for more convenient methods and systems to simplify service transfer.

SUMMARY

It is to be understood that both the following general description and the following detailed description are exemplary and explanatory only and are not restrictive, as claimed. Provided are methods and systems for transferring service from one device to another device. An example method can comprise receiving service at a first/current user device, detecting a movement of the first user device, determining the direction of the movement, and requesting the service be provided to a second/target user device in the direction of the movement. As an example, service can comprise communication session service, network access service, video service, audio service, short message service, multimedia message service, and the like. In an aspect, the movement of the user device can be detected by one or more motion or position sensors such as a magnetometer, a gyroscope, an accelerometer, a radio transceiver, a global positioning system (GPS) device, a compass, or other motion or position sensors implemented in the user device or in the vicinity of the user device. In an aspect, the detection of movement can comprise detection of direction of movement. In another aspect, the detection of movement can comprise detection of speed of movement. In an aspect, to enable a service transfer, a user can point a first/current user device to a second/target user device. The pointing can be achieved by moving the first user device in the direction of the second user device at certain speed.

In an aspect, an example apparatus can comprise one or more sensors for detecting a movement of the apparatus and one or more processors coupled to the one or more sensors. In an aspect, the one or more processors can be configured for performing steps comprising receiving a service, receiving an indication of a movement of the apparatus from the sensor, determining a direction of the movement, and requesting the service be provided to another apparatus in the direction of the movement.

In another aspect, an example apparatus can comprise a memory configured for storing service transfer data and a processor coupled to the memory. In an aspect, the service transfer data can comprise a request from a first user device to provide or transfer the service to a second user device and the direction of the second user device relative to the first user device. The service transfer data can be stored in a service transfer database in the memory. In an aspect, the processor can be configured for providing service to a first user device, receiving service transfer data, identifying a second user device based on the transfer data, and providing the service to the second user device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
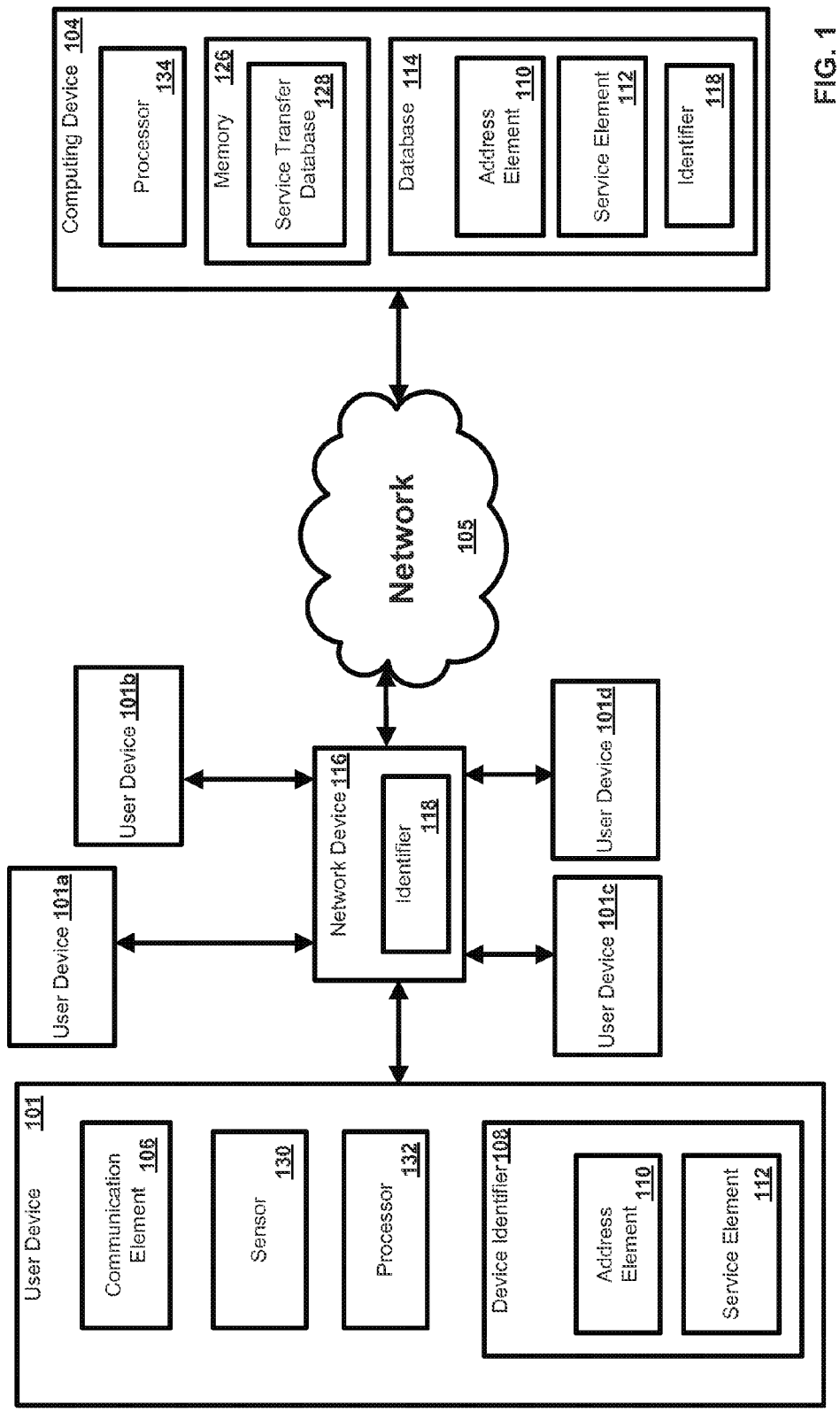
FIG. 1 is a block diagram of an exemplary system for service transfer.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for transferring service between user devices. In an aspect, service can be transferred from a first/current user device to a second/target user device by moving the first user device toward the second user device. As an example, the user device can comprise a personal computer, a mobile device, a tablet device, a smart phone, a watch, glasses, a television, or other portable device. The user device can be equipped with one or more sensors capable of detecting the movement and/or position of the user device. In an aspect, the movement can be detected by one or more sensors such as a magnetometer, a gyroscope, an accelerometer, a radio transceiver, a global positioning system (GPS) device, a compass, or other types of motion or position sensors. The sensors can be built into the user device. In another aspect, a user device can be used to transfer service between other user devices.

In one aspect, a plurality of user devices can be configured to use a common application. As an example, the plurality of user devices can be registered via the common application. The registered user devices can become transferable devices. A transferable device can be the user device to which the service can be transferred. A registered user device can share its information with other registered user devices via the common application. For example, a registered user device can share its position information with other registered user devices. The position information can comprise position coordinates (e.g., GPS coordinates) of a user device and its position with respect to other user devices. As an example, position information can comprise longitude, latitude, altitude, and the like from a satellite based positioning system. In an aspect, the movement (e.g., direction and speed) of a registered user device can be calculated based on the real-time position change of the user device. When a registered user device changes its position, the position information can be updated and shared with other registered user devices. In another aspect, a registered user device can share its identity (e.g., device identifier) with other registered user devices. In an aspect, the shared information (e.g., position and/movement information, device identifier) can be registration information. The registration information can be stored in the memories of one or more (e.g., all) registered user devices. The registration information can also be stored in the memory of a computing device as service transfer data. In an aspect, the computing device can be configured for providing service to a first user device, receiving service transfer data from the memory, identifying a second user device based on the transfer data, and providing the service to the second user device.

In another aspect, the common application can be implemented as an application installed on user devices or a web application that can be accessed over a network such as internet or intranet. As an example, an address book can be used as the common application. As another example, a friends list, a recent contacts list, a frequent contact list, a social media sourced friends list, and the like, can be used as the common application. In an aspect, the common application can be accessible through an onscreen guide (e.g., application menu, web browser interface). A user can register a user device by executing the common application installed on the user device or logging onto the application located across the web. In an aspect, the registered user devices can share their information via the common application. For example, position information (e.g., GPS coordinates), movement information (e.g., direction and speed)

and other information (e.g., device identifier) associated with the registered user devices can be shared via the common application.

In another aspect, a plurality of user devices can be configured to connect to the same network through a fixed common network access point base. The user devices configured through the fixed common network access point can be transferable devices. The position and/or movement of a user device can be defined with respect to the common network access point. As an example, the common network access point can be a network device, such as a Wi-Fi router or a femtocell. The position of a user device can be measured in terms of angle and distance with respect to the common network access point. In an aspect, the movement (e.g., direction and speed) of a user device can be calculated based on the real-time position change (e.g., angle change and distance change with respect to the common network access point). As such, the position and/or movement information of a user device with respect to another user device within the common network can be calculated. In an aspect, the position and/or movement information can be shared via the common network. For example, the position and/or movement information can be shared via a wired and/or wireless network using Wi-Fi, Bluetooth or any desired method or standard. In another aspect, a user device can share its identity (e.g., device identifier) with other user devices within the common network. The shared information (e.g., position and/or movement information, device identifier) can be registration information. The registration information can be stored in the memories of the user devices within the common network. The registration information can also be stored in the memory of a computing device as service transfer data. In an aspect, the computing device can be configured for providing service to a first user device, receiving service transfer data from the memory, identifying a second user device based on the transfer data, and providing the service to the second user device.

In an aspect, position information of a plurality of user devices can be combined with movement information (e.g., speed of a movement, acceleration of a movement, duration of a movement, distance of a movement) of a first user device to determine a second user device. For example, when a slow movement (e.g., speed lower than a predefined value, acceleration lower than a predefined value), a short duration (e.g., less than 3 seconds) movement, a short distance (e.g., less than 20 centimeters) movement, or a combination thereof, of the first user device is detected, it can be assumed that a user intends to transfer service from the first user device to a second user device with close proximity to the first user device. Therefore, user devices with distance greater than a predefined value (e.g., 3 meters) to the first user device can be excluded as a second user device in a service transfer. By contrast, when a fast movement (e.g., speed higher than a predefined value, acceleration higher than a predefined value), a long duration (e.g., more than 3 seconds) movement, a long distance (e.g., more than 20 centimeters) movement, or a combination thereof, of a first user device is detected, it can be assumed that a user intends to transfer service from the first user device to a second user device not in close proximity to the first user device. As a result, user devices with distance less than a predefined value (e.g., 2 meters) to the first user device can be excluded as a second user device in a service transfer.

FIG. 1 is a block diagram of an exemplary system. In an aspect, a plurality of user devices 101, 101a, 101b, 101c and 101d can be configured to receive service from a computing device 104. The user devices 101, 101a, 101b, 101c and 101d can be any device capable of communicating with the computing device 104. In an aspect, user devices 101, 101a, 101b, 101c and 101d can be electronic devices, for example, personal computers, smart phones, laptops, tablets, watches, glasses, televisions, and the like. In an aspect, user devices 101, 101a, 101b, 101c and 101d can be different types of devices. In an aspect, the service can comprise communication session service (e.g., phone call), network access service (e.g., web browsing), video service, audio service, short message service, multimedia message service, and the like.

By way of example, the remote computing device 104 can comprise a server, a network computer, a peer device or other common network node capable of providing service to the user devices 101, 101a, 101b, 101c and 101d. In an aspect, the computing device 104 can be disposed locally or remotely relative to user devices 101, 101a, 101b, 101c and 101d.

In an aspect, user devices 101, 101a, 101b, 101c and 101d and the computing device 104 can be in communication via a private and/or a public network 105, for example, a local area network or the Internet. Other possible modes of communication between devices are wired and wireless telecommunication channels. As an example, the network 105 can comprise a packet switched network (e.g., internet protocol based network), a non-packet switched network (e.g., quadrature amplitude modulation based network), and/or the like. The network 105 can comprise network adapters, switches, routers, and the like connected through wireless links (e.g., radio frequency, satellite) and/or physical links (e.g., fiber optic cable, coaxial cable, Ethernet cable). Other forms of communications can be used such as wired and wireless telecommunication channels, for example, Wi-Fi, Bluetooth or any desired method or standard.

In one aspect, the plurality of user devices 101, 101a, 101b, 101c and 101d can be configured to use a common application. The user devices registered via the common application can become transferable user devices. In an aspect, the plurality of user devices can be configured to connect to the same network through a fixed common network access point base (e.g., network device 116), as shown in FIG. 1. As an example, the network device 116 can be a Wi-Fi router or a femtocell. The user devices configured within the same network can become transferable devices.

In an aspect, a user device (e.g., 101, 101a, 101b, 101c, or 101d) can comprise a communication element 106 that provides a user interface for interaction with the respective user device 101, 101a, 101b, 101c and 101d and/or the computing device 104. Communication element 106 can be any interface for presenting and/or receiving information to/from the user. An example interface can be a communication interface such as a web browser, application guide, and the like. For example, the user can register a user device by executing a common application installed on the user devices or logging onto the application located across the web via the communication element 106. In an aspect, the user can log onto the application automatically once the user logs onto the user device or turns on the user device. Other configurations of software, hardware, and/or interfaces can be used to enable communication between the user, the computing device 104, and one or more of the user devices 101, 101a, 101b, 101c and 101d. The communication element 106 can be used to perform a variety of operations, for example, request or query various files from a local source and/or a remote source, for example, the user devices 101, 101a, 101b, 101c, 101d, and the computing device 104.

In an aspect, a user device (e.g., user device 101, 101*a*, 101*b*, 101*c*, 101*d*) can comprise sensor 130 to detect movement or determine position of the respective user device 101, 101*a*, 101*b*, 101*c* and 101*d*. In an aspect, the sensor 130 can comprise one or more motion or position sensors such as an accelerometer, a magnetometer, a gyroscope, a radio transceiver, a global positioning system (GPS) device, a geo-location device, a compass, or the like.

As an example, an accelerometer can be used to identify movement of a user device. In an aspect, the accelerometer can detect speed changes. A speed change greater than a predefined value can be interpreted as a signal to initiate a service transfer.

As another example, a GPS device or a geo-location device can be used to identify the position and/or movement of a user device. Specifically, the GPS device can provide position information in terms of GPS coordinates such as longitude, latitude, altitude and the like. The geo-location device can provide position information in terms of real-world geographical location. The speed and direction of the movement can be calculated based on the real-time position change. The real-time position change greater than a predefined value can be interpreted as a signal to initiate a service transfer.

As another example, when the user devices are configured to a common base point, a magnetometer can be used to provide the position of a user device with respect to the fixed common base point (e.g., Wi-Fi router, a femtocell) or geographical north. The position information can be measured in terms of the angle and distance relative to the common base point or geographical north. For example, received signal strength indicator (RSSI) can be used to indicate the distance of the user device from the fixed common base point, such as a Wi-Fi router or a femtocell. The speed and direction of the movement can be calculated based on the real-time position change (e.g., angle change with respect to the common base point, distance change with respect to the common base point). A real-time position change greater than a predefined value can be interpreted as a signal to initiate a service transfer.

As another example, a gyroscope can be used to identify orientation change during the movement of a user device. For example, the real-time orientation of the user device can be recorded based on the motion of a gyroscope. The speed and direction of the movement can be calculated based on the real-time orientation change. A real-time orientation change greater than a predefined value can be interpreted as a signal to initiate a service transfer.

As another example, a compass can be used to identify orientation change during the movement of a user device. For example, angle (e.g., degrees) on the compass of the user device can be recorded based on the motion of the user device. The direction of the movement can be calculated based on the angle change. An angle change greater than a predefined value can be interpreted as a signal to initiate a service transfer.

In an aspect, a user device (e.g., user device 101, 101*a*, 101*b*, 101*c*, 101*d*) can comprise a processor 132. The processor 132 can be coupled to the sensor 130. In an aspect, the processor 132 can be configured for receiving a service, receiving an indication of movement of a respective user device from the sensor 130, determining a direction of the movement, and requesting the service be provided to another user device in the direction of the movement. For example, the sensor 130 can detect the movement of a user device (e.g., user device 101), and the real-time position information of the user device can be transmitted from the sensor 130 to the processor 132. The processor 132 can be configured to calculate the direction and speed of the movement based on real-time position change of a user device. As an example, the processor 132 can be configured for receiving a service from the computing device 104, receiving an indication of a movement of a user device from the sensor 130, determining a direction of the movement, and requesting the service be provided to another user device in the direction of the movement.

In an aspect, a user device can be associated with a user identifier or device identifier 108. As an example, the device identifier 108 can be any identifier, token, character, string, or the like, for differentiating one user or user device from another user or user device. In a further aspect, the device identifier 108 can identify a user or user device as belonging to a particular class of users or user devices. As a further example, the device identifier 108 can comprise information relating to the user device, such as a manufacturer, a model or type of device, a service provider associated with the user device, a state of the user device, a locator, and/or a label or classifier. Other information can be represented by the device identifier 108. In an aspect, the device identifier 108 can be part of service transfer data and stored in the computing device 104. By way of example, device identifier 108 can be used by the computing device 104 to address service to a specific user device. Specifically, the computing device 104 can obtain the device identifier 108 associated with a user device and thereby provide the service to the user device.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device and the computing device 104 or other devices and/or networks. As a further example, the address element 110 can be used as an identifier or locator of the user device 101. In an aspect, the address element 110 can be persistent for a particular network. In an aspect, the address element 110 can be part of service transfer data and stored in the computing device 104. For example, the computing device 104 can obtain the address element 110 associated with a specific user device and thereby deliver service to the specific user device at its location.

In an aspect, the service element 112 can comprise an identification of a service provider associated with the user device and/or with the class of user device. The class of the user device can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device. As a further example, the service element 112 can comprise information relating to a preferred service provider for one or more particular services relating to the user device. In an aspect, the address element 110 can be used to identify or retrieve data from the service element 112, or vise versa. As a further example, one or more of the address element 110 and the service element 112 can be stored remotely from the user device and retrieved by one or more devices such as the computing device 104.

In an aspect, the computing device 104 can be configured as (or disposed at) a central location (e.g., a headend, or processing facility), which can receive content (e.g., data, input programming) from multiple sources. By way of example, the remote computing device 104 can comprise a server, a network computer, a peer device or other common network node, and the like. The computing device 104 can combine the content from the multiple sources and can distribute the content to user (e.g., subscriber) or user device locations via a distribution system. As an example, the user devices 101, 101a, 101b, 101c and 101d can request and/or retrieve a file from the computing device 104. In an aspect, the computing device 104 can store information relating to the user devices 101, 101a, 101b, 101c and 101d such as the device identifier 108, address element 110 and/or the service element 112. As an example, the computing device 104 can obtain the device identifier 108 from a user device and retrieve information such as the address element 110 and/or the service element 112. As a further example, the computing device 104 can obtain the address element 110 from a user device and can retrieve the service element 112, or vice versa.

In an aspect, the computing device 104 can comprise a memory 126 configured to store service transfer data. Specifically, the service transfer data can be stored in a service transfer database 128. As an example, the service transfer database 128 can be an in-memory database. In an aspect, service transfer data can comprise position information of the user devices 101, 101a, 101b, 101c and 101d. In another aspect, service transfer data can comprise the direction and speed of a moving user device. In another aspect, service transfer data can comprise the device identities (e.g., device identifier 108, address element 110) of user devices 101, 101a, 101b, 101c and 101d.

In an aspect, the computing device 104 can comprise a processor 134. The processor 134 can be coupled to the memory 126. In an aspect, the processor 134 can be configured for providing service to a first user device (e.g., user device 101) receiving service transfer data from the memory 126, identifying a second user device based on the transfer data, and providing the service to the second user device (e.g., user device 101a, b, c, d). As an example, processor 134 can be configured to retrieve service transfer data from the memory 126, and map the movement of the first user device (e.g., user device 101) with respect to the position of other user devices (e.g., user devices 101a, 101b, 101c and 101d) to determine the second user device.

In an aspect, the network device 116 can be in communication with a network, such as network 105. As an example, the network device 116 can facilitate the connection of user devices, such as user devices 101, 101a, 101b, 101c and 101d to the network 105. As a further example, the network device 116 can be configured as a wireless access point (WAP). In an aspect, the network device 116 can be configured to allow one or more wireless devices to connect to a wired and/or wireless network using Wi-Fi, Bluetooth, or any desired method or standard.

In an aspect, the network device 116 can be configured as a local area network (LAN). As an example, the network device 116 can comprise a dual band wireless access point. As an example, the network devices 116 can be configured with a first service set identifier (SSID) (e.g., associated with a user network or private network) to function as a local network for a particular user or users. As a further example, the network device 116 can be configured with a second service set identifier (SSID) (e.g., associated with a public/community network or a hidden network) to function as a secondary network or redundant network for connected communication devices.

In an aspect, the network device 116 can comprise an identifier 118. As an example, one or more identifiers can be or relate to an Internet Protocol (IP) Address IPV4/IPV6, a media access control address (MAC address), or the like. As a further example, the identifier 118 can be a unique identifier for facilitating communications on the physical network segment. In an aspect, the network devices 116 can comprise a distinct identifier 118. As an example, the identifiers 118 can be associated with a physical location of the network devices 116. In another aspect, a plurality of user devices 101, 101a, 101b, 101c and 101d can be configured to the same network through the network device 116 as a fixed common network access point base. The position of a user device can be defined relative to the network device 116. As an example, the network device 116 can be a Wi-Fi router or a femtocell.

Figure 2:
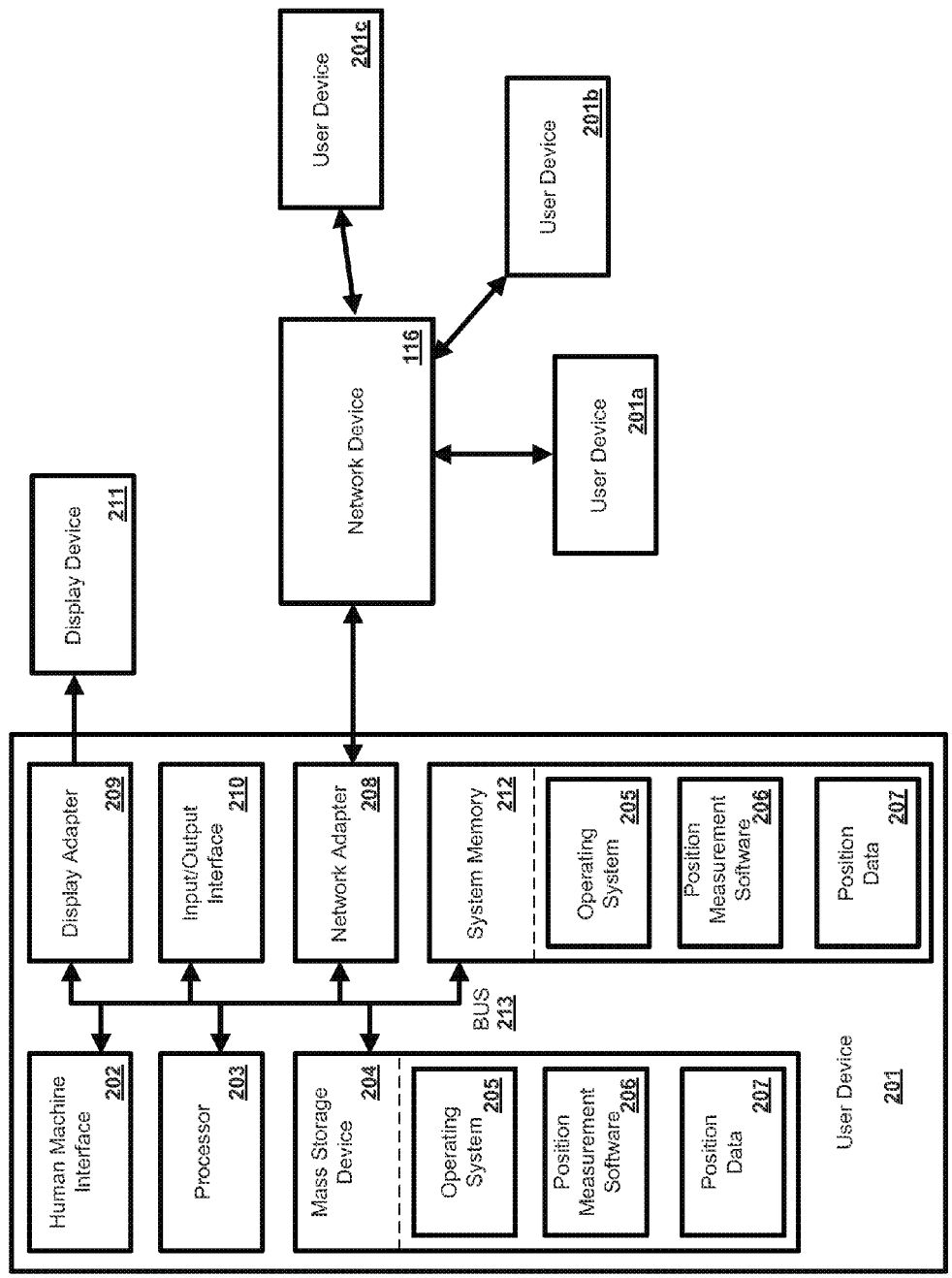
FIG. 2 is a block diagram illustrating example devices and operating environment in which the present systems and methods can operate.

In an aspect, the methods and systems can be implemented on a user device 201 as illustrated in FIG. 2 and described below. By way of example, user devices 101, 101a, 101b, 101c and 101d of FIG. 1 can be a user device 201, 201a, 201b, 201c as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media, including memory storage devices.

Further, one skilled in the art will appreciate that the systems and methods disclosed herein can be implemented via a general-purpose computing device in the form of user devices 201, 201a, 201b and 201c. The components of the user devices 201, 201a, 201b and 201c can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a processor bus, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description, can also be implemented over a wired or wireless network connection, and each of the subsystems, including the processor 203, a mass storage device 204, an operating system 205, position measurement software 206, position data 207, a network adapter 208, system memory 212, an Input/Output Interface 210, a display adapter 209, a display device 211, and a human machine interface 202, can be contained within one or more user devices 201, 201a, 201b and 201c at physically separate locations, connected through buses of this form, in effect implementing a fully distributed system.

The user devices 201, 201a, 201b and 201c typically comprise a variety of computer readable media. Exemplary readable media can be any available media that is accessible by the user devices 201, 201a, 201b and 201c and comprises, for example and not meant to be limiting, both volatile and non-volatile media, and removable and non-removable media. The system memory 212 comprises computer readable media in the form of volatile memory, such as random access memory (RAM), and/or non-volatile memory, such as read only memory (ROM). The system memory 212 typically contains data, such as position data 207, and/or program modules, such as operating system 205 and position measurement software 206 that are immediately accessible to and/or are presently operated on by the processing unit 203.

In another aspect, the user devices 201, 201a, 201b and 201c can also comprise other removable/non-removable, volatile/non-volatile computer storage media. By way of example, FIG. 2 illustrates a mass storage device 204 that can provide non-volatile storage of computer code, computer readable instructions, data structures, program modules, and other data for the user devices 201, 201a, 201b and 201c. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and position measurement software 206. Each of the operating system 205 and position measurement software 206 (or some combination thereof) can comprise elements of the programming and the position measurement software 206. Position data 207 can also be stored on the mass storage device 204. Position data 207 can be stored in any of one or more databases known in the art. Examples of such databases comprise, DB2®, Microsoft® Access, Microsoft® SQL Server, Oracle®, mySQL, PostgreSQL, Hadoop, Map Reduce and the like. The databases can be centralized or distributed across multiple systems.

In another aspect, the user can enter commands and information into the user devices 201, 201a, 201b and 201c via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, a game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the user devices 201, 201a, 201b and 201c can have more than one display adapter 209 and the user device 201 can have more than one display device 211. For example, a display device can be a monitor, an LCD (Liquid Crystal Display), or a projector. In addition to the display device 211, other output peripheral devices can comprise components, such as speakers (not shown) and a printer (not shown), which can be connected to the user devices 201, 201a, 201b and 201c via Input/Output Interface 210. Any step and/or result of the methods can be output in any form to an output device. Such output can be any form of visual representation, including, but not limited to, textual, graphical, animation, and the like. The display 211 and user devices 201, 201a, 201b and 201c can be part of one device, or separate devices.

The user device 201 can operate in a networked environment using logical connections to one or more user devices 201a, 201b, 201c. By way of example, a user device can be a personal computer, a portable computer, a smartphone, a server, a router, a network computer, a peer device or other common network node, and so on. Logical connections between the user devices 201, 201a, 201b and 201c can be made via a network device 116. Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 205, are illustrated herein as discrete blocks, although it is recognized that such programs and components reside at various times in different storage components of the user devices 201, 201a, 201b and 201c are executed by the data processor(s) of the computer. An implementation of position measurement software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of informations, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
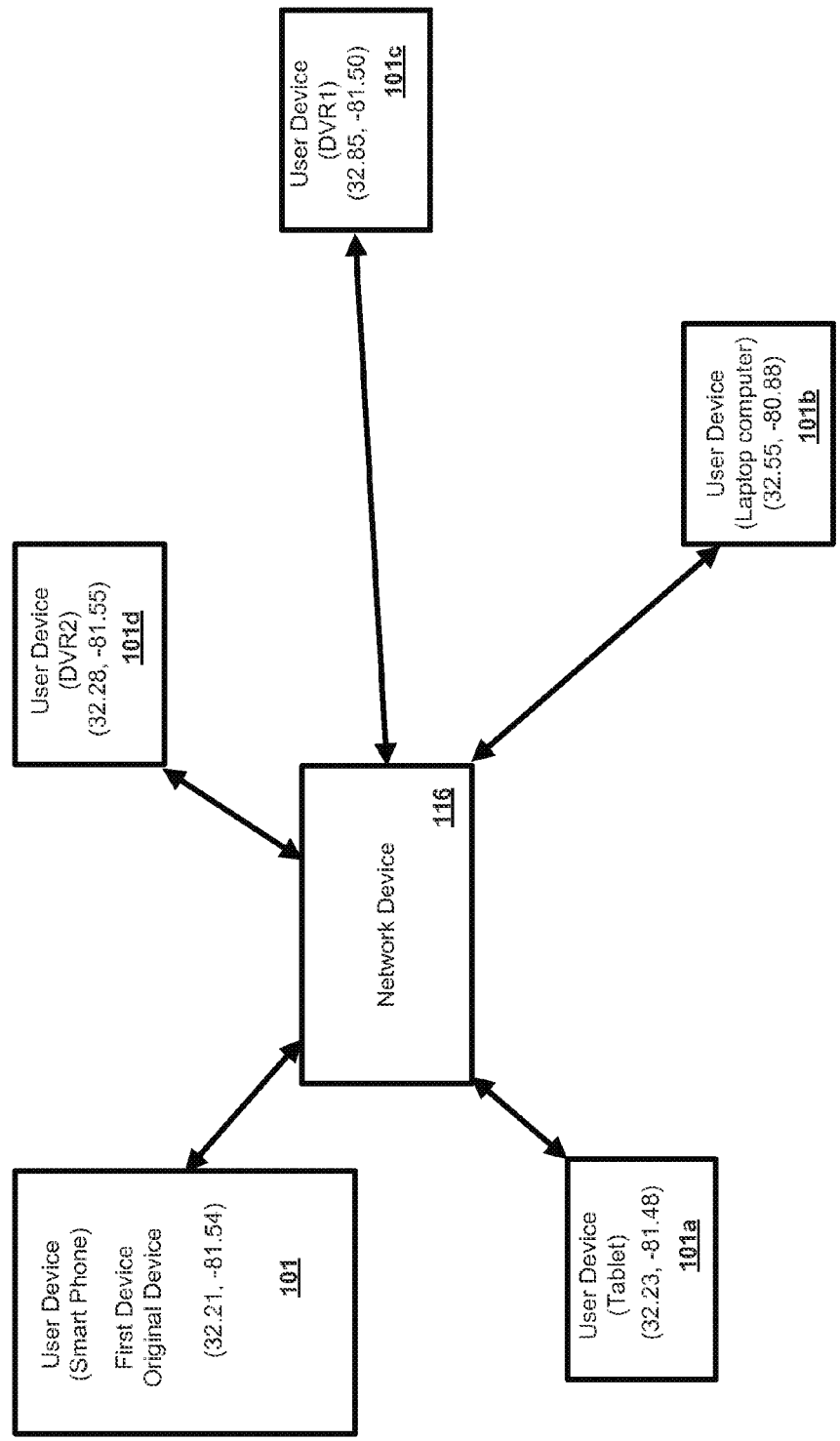
FIG. 3 is a block diagram of an exemplary system environment for service transfer.

FIG. 3 illustrates a block diagram of an exemplary system environment for service transfer. The system can comprise a network device 116 and a plurality of user devices 101, 101a, 101b, 101c and 101d connected via the network device 116. In one aspect, network device 116 can serve as a wireless base station. For example, network devices 116 can be configured to allow user devices 101, 101a, 101b, 101c and 101d to connect to a wired and/or wireless network using Wi-Fi, Bluetooth or any desired method or standard. All user devices 101, 101a, 101b, 101c and 101d visible to the network device 116 can be considered transferable second user devices/target devices for service transfer. Communications between user devices 101, 101a, 101b, 101c and 101d can be routed through network device 116. A computing device (not shown) connected to network device 116 can be equipped with a processor 134 configured to determine position and/or movement for one or more user devices visible to the network device 116. The location and/or position of each user device (e.g., user device 101, 101a, 101b, 101c and 101d) can be used to determine a second user device/target user device for service transfer.

In one aspect, user devices 101, 101a, 101b, 101c, 101d can acquire GPS coordinates. For example, global positioning system of the user devices 101a, 101b, 101c, 101d can collect latitude and longitude of the respective user devices. Elevation and/or altitude information can also be included. The change of GPS coordinates of a first user device (e.g., user device 101) relative to GPS coordinates of each of a plurality of second user devices (e.g., user devices 101a, 101b, 101c, 101d) within the network can be used to determine direction of movement of the first user device relative to the plurality of second user devices. As a result, the user device in the resulting or final direction of movement of the first user device (e.g., user device 101) can be selected as the second user device for service transfer.

It should be noted that any type of location and/or distance measurement can be used to determine the second user device. For example, a combination of RSSI and GPS coordinates can be used for this purpose. It should also be noted that the present disclosure is not limited thereto and is equally applicable to other location and/or distance measurement techniques as will be readily apparent to those skilled in the art from the description provided herein. For example, orientation information of a user device can be used to facilitate the selection of a second user device. In an aspect, the orientation information can be combined with location information such as RSSI reading and/or GPS coordinates to determine a target user device/second user device.

Figure 4:
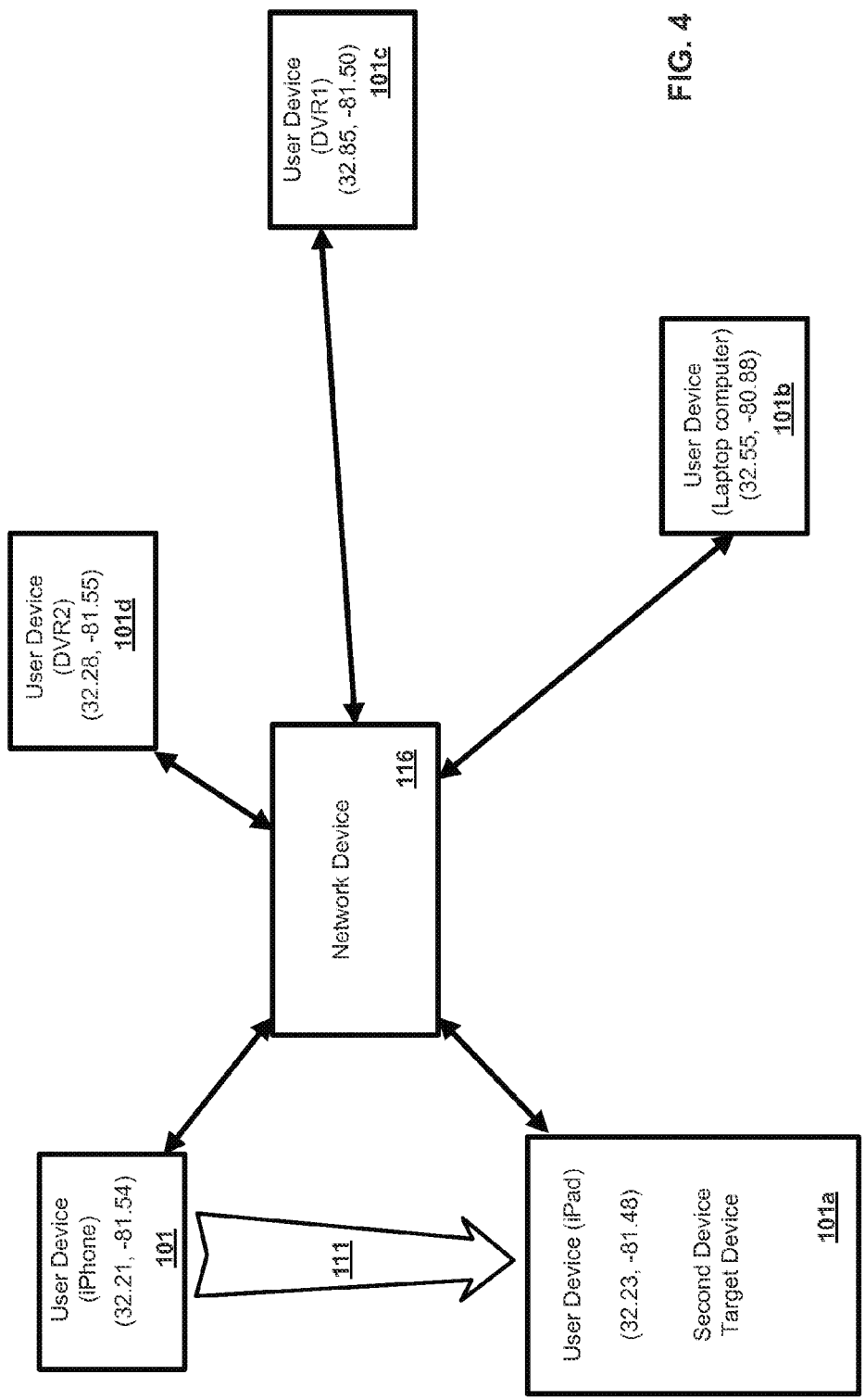
FIG. 4 is a block diagram of an exemplary system environment for service transfer.

FIG. 4 illustrates a block diagram of an exemplary system environment. GPS coordinates are shown for each user device, although any other form of position/movement detection can be used. The system can comprise a network device 116 and a plurality of user devices 101, 101a, 101b, 101c and 101d connected via the network device 116. In one aspect, network device 116 can serve as a wireless base station. For example, network devices 116 can be configured to allow user devices 101, 101a, 101b, 101c and 101d to connect to a wired and/or wireless network using Wi-Fi, Bluetooth or any desired method or standard. All user devices 101, 101a, 101b, 101c and 101d visible to the network device 116 can be considered transferable second user devices/target devices for service transfer. Communications between user devices 101, 101a, 101b, 101c and 101d can be routed through network device 116.

In an aspect, the user device 101 can move toward the user device 101a. Arrow 111 indicates user device 101 moving in the direction of user device 101a. As an example, a computing device (not shown) connected to network device 116 can be equipped with a processor configured to determine position and/or movement of the user device 101. As another example, the user device 101 can determine and report its position, movement, and/or speed to the computing device. The location and/or position of other user device (e.g., user devices 101a, 101b, 101c and 101d) with respect to the user device 101 can be determined by the computing device. The user device 101a, 101b, 101c and 101d that is in the resulting or final direction of movement of the user device 101 can be selected as the second user device for service transfer. User device 101a can therefore be selected as the second user device. Service being consumed on user device 101 can then be transferred to user device 101a. In another aspect, a service can be transferred between user devices 101a, b, c, d based on movement of user device 101. For example, user device 101 can point at user device 101d and then user device 101 can be moved in the direction of user device 101a. The result of such movement can be that service being consumed on user device 101d is transferred to user device 101a. In another aspect, a user can designate one or more specific user devices as non-transferable or block certain types of transfer from one device to another. The location information (e.g., GPS coordinates) of any designated non-transferable user devices can be excluded from consideration.

In an aspect, service transfer can be activated by a user command. Examples of user commands can include multi-touch gestures, mouse clicks and remote control commands. The type of command utilized will be appropriate for the device in use. For example, a multi-touch gesture can be used for a smartphone, tablet or a multi-touch trackpad can be used on a desktop computer. A remote control can be used for a set top box. The user devices within a same network can operate on the same or different platforms. For example, service transfer can be transferred from one DVR to another, from a laptop to a tablet, or from a smart phone to a television.

In an aspect, more than one device can be transferable second user device to receive service. For example, more than one device can be on the direction of movement of a first user device. In an aspect, the device closest to the moving device on the direction of movement of the first user device can be automatically selected as second user device. In another aspect, a notification can be displayed on the first user device for a user to select a user intended device from a plurality of transferable second user devices. The notification can comprise identity (e.g., iPad, computer, smartphone) and location information of the plurality of transferable second user devices.

In an aspect, service can be provided to more than one device. For example, a user command to activate service transfer can indicate whether to continue providing service to a first user device when the service is provided to a second user device. In an aspect, a user can indicate that the first user device will continue to receive service when one or more second user devices are identified. For example, service (e.g., video call service) being provided to the first user device can be provided a second user or second user device simultaneously to establish a video call between the first user device and a selected second user device. As another example, service (e.g., video call service) can be provided to more than one second user or second user devices. For example, a three-way video call can be established when a video call service is provided to three user devices simultaneously.

Figure 5:
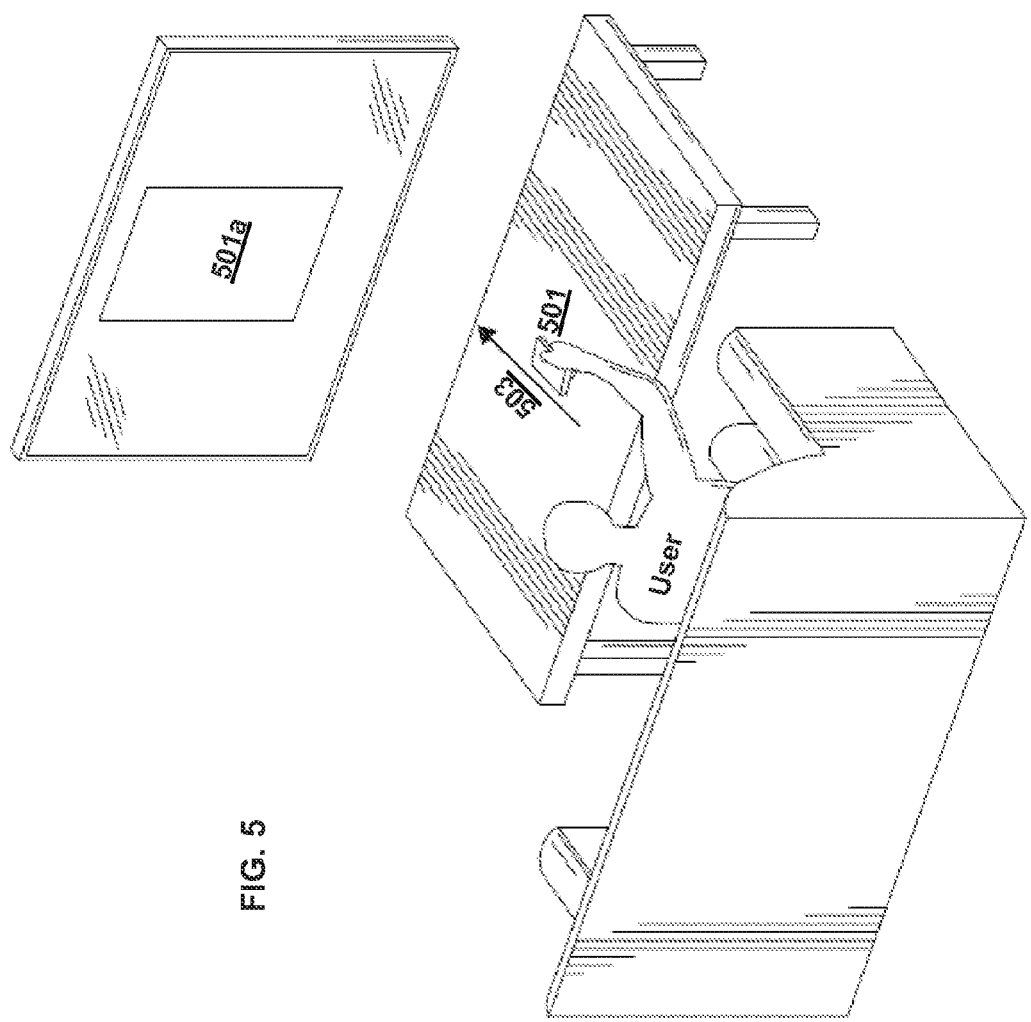
FIG. 5 is a diagram of an exemplary system environment for service transfer.

FIG. 5 is a diagram of an exemplary system environment for service transfer. A user holding a smartphone 501 is moving the smartphone 501 in the direction of television 501a. Arrow 503 indicates smartphone 501 is moving in the direction of television 501a. In an aspect, the user can point the smartphone 501 at the television 501a to which the user wants the service (e.g., video program) provided or transferred. Pointing can be achieved by moving the smartphone 501 to the direction of the television 501a at certain speed. One or more motion or position sensors implemented in the smartphone 501 can be used to detect direction, movement, and/or speed. In an aspect, a computing device (not shown) in communication with the smartphone 501 can be equipped with a processor configured to determine position, movement, and/or speed of the smartphone 501. The television 501a can be determined to receive transferred service as it is in the direction of the movement of smartphone 501. In an aspect, the user can click a button on the smartphone 501 prior to initiating a movement to confirm intent to transfer service. In an aspect, the service transferred to the television 501a can still be provided on the smartphone 501. The user can transfer the service provided on the smartphone 501 to another user device such as a tablet (not shown) via moving the smartphone 501 to the other user device. In an aspect, the user can stop the service transferred to the television 501a via the smartphone 501 after the service is provided to the other device.

Figure 6:
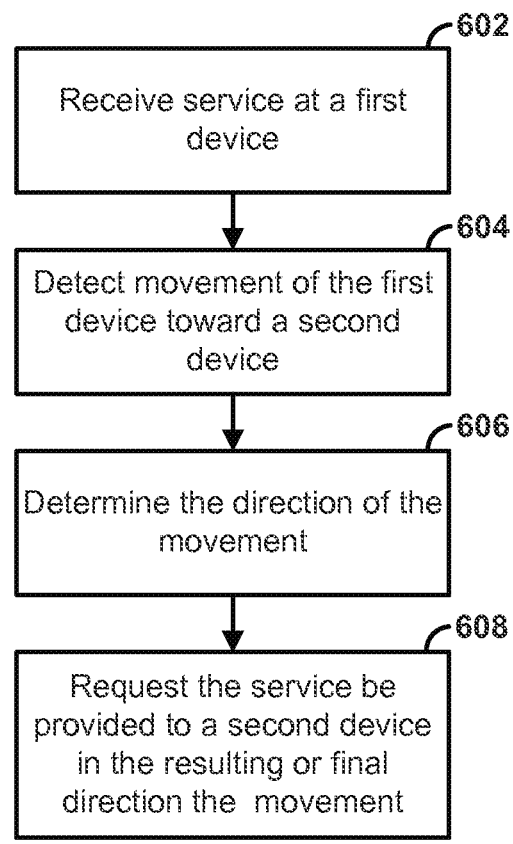
FIG. 6 is a flowchart illustrating an example method for service transfer.

FIG. 6 is a flowchart illustrating an example method for service transfer. At step 602, a service can be received at a first user device. In an aspect, the service can comprise a communication session (e.g., a telephone call), network access, video service, audio service, short message service, multimedia message service, and the like. The first user device can comprise a personal computer, a mobile device, a television, a tablet device, a smart phone, a watch, glasses, or other portable device. As an example, the service can be received from the computing device 104 at a first user device (e.g., user device 101).

At step 604, a movement of the first user device can be detected. In an aspect, a user of the first user device can point the first user device at a second user device to which the user wants the service transferred. Pointing can be achieved by moving the first user device to the direction of the second user device at certain speed. In an aspect, one or more motion or position sensors implemented in the first user device can be used to detect the movement. As an example, detecting a movement of the first user device can comprise receiving a signal from one or more of a magnetometer, a gyroscope, an accelerometer, a radio transceiver, and a global positioning system, a light system such as infrared (IR), implemented in the first user device.

As an example, an accelerometer can be used to identify movement of a user device. In an aspect, the accelerometer can detect speed changes (e.g., moving at a certain speed, increasing and/or decreasing speed, stopping movement, and the like). In an aspect, a speed change greater than a predefined value can be interpreted as a signal to initiate service transfer.

As another example, a GPS device or a geo-location device can also be used to identify the position and/or movement of a user device. Specifically, the GPS device can provide position information in terms of GPS coordinates, such as longitude, latitude, altitude, and the like. The geo-location device can provide position information in terms of real-world geographical location. In an aspect, speed and direction of the movement can be calculated based on the real-time position change (e.g., GPS coordinates change). In an aspect, a real-time position change greater than a predefined value can be interpreted as a signal to initiate a service transfer.

As another example, in the scenario of a group of user devices configured to connect to the same network via a common base point, a magnetometer can be used to provide the position information in terms of the position of a user device relative to the fixed common base point (e.g., Wi-Fi router). As another example, a received signal strength indicator (RSSI) can be used to indicate the distance of a user device from the fixed common base point such as a Wi-Fi router. The speed and direction of the movement can be calculated based on the real-time position change (e.g., angle change with respect to the common base point, distance change with respect to the common base point). In an aspect, a real-time position change greater than a predefined value can be interpreted as a signal to initiate a service transfer.

As another example, a gyroscope can be used to detect orientation changes during the movement of a user device. For example, a real-time orientation change of the user device can be detected by a gyroscope. The speed and direction of the movement can be calculated based on the real-time orientation change. In an aspect, a real-time orientation change greater than a predefined value can be interpreted as a signal to initiate a service transfer.

At step 606, the direction of the movement of the first user device can be determined. In an aspect, determining a direction of the movement can comprise receiving a signal from one or more sensors, such as a magnetometer, a gyroscope, an accelerometer, a radio transceiver, and a global positioning system (GPS) device, a compass, as discussed in step 604. As an example, the movement of a user device can be calculated based on real-time GPS coordinates change. As another example, the position and/or movement of a user device can be calculated based on real-time angle change and distance change relative to a common network access point (e.g., a Wi-Fi router, a femtocell). In an aspect, the real-time position information can be sent to processor 132 of a user device (e.g., user device 101). The processor 132 can calculate the real-time position change and thereby determine the direction of the movement. In an aspect, the speed of the movement can be determined. In an aspect, the position (e.g., start position, end position) and movement information (e.g., position change, speed, direction) of the first user device (e.g., user device 101) can be shared with other user transferable user devices (e.g., user devices 101a, 101b, 101c and 101d) and computing device 104 via a wired and/or wireless network using Wi-Fi, Bluetooth or any desired method or standard. In an aspect, the start position can be the position the user device was in prior to initiation of movement and the end position can be the position the user device is in after completion of movement. In an aspect, the end position can be in the direction of desired service transfer.

At step 608, the user, via the first user device, can request the service be transferred or provided to a second user device in the resulting or final direction of movement. In an aspect, the request can comprise the direction of the movement of the first user device. In an aspect, the request can further comprise the speed of the movement of the first user device. As an example, computing device 104 can receive the request. In an aspect, the computing device 104 can be configured to retrieve service transfer data (e.g., position information, device identifier) of the user devices (e.g., user devices 101a, 101b, 101c and 101d) from the service transfer database 128, to map the direction of the movement of the first user device with respect to the position of the other user devices in the service transfer database 128, and thus identify the second/target user device. In an aspect, the second user device can be identified based on the direction and the speed of the movement. In an aspect, the request can be confirmed by a user of the first user device before the request can be sent to the computing device 104. For example, a service transfer can be confirmed via a user clicking a button on the first user device (e.g., user device 101). In an aspect, the user can click a button prior to initiating a movement to confirm intent to transfer service. This can prevent providing service to a second user device in cases where movement of the first user device that is not intended for service transfer.

Figure 7:
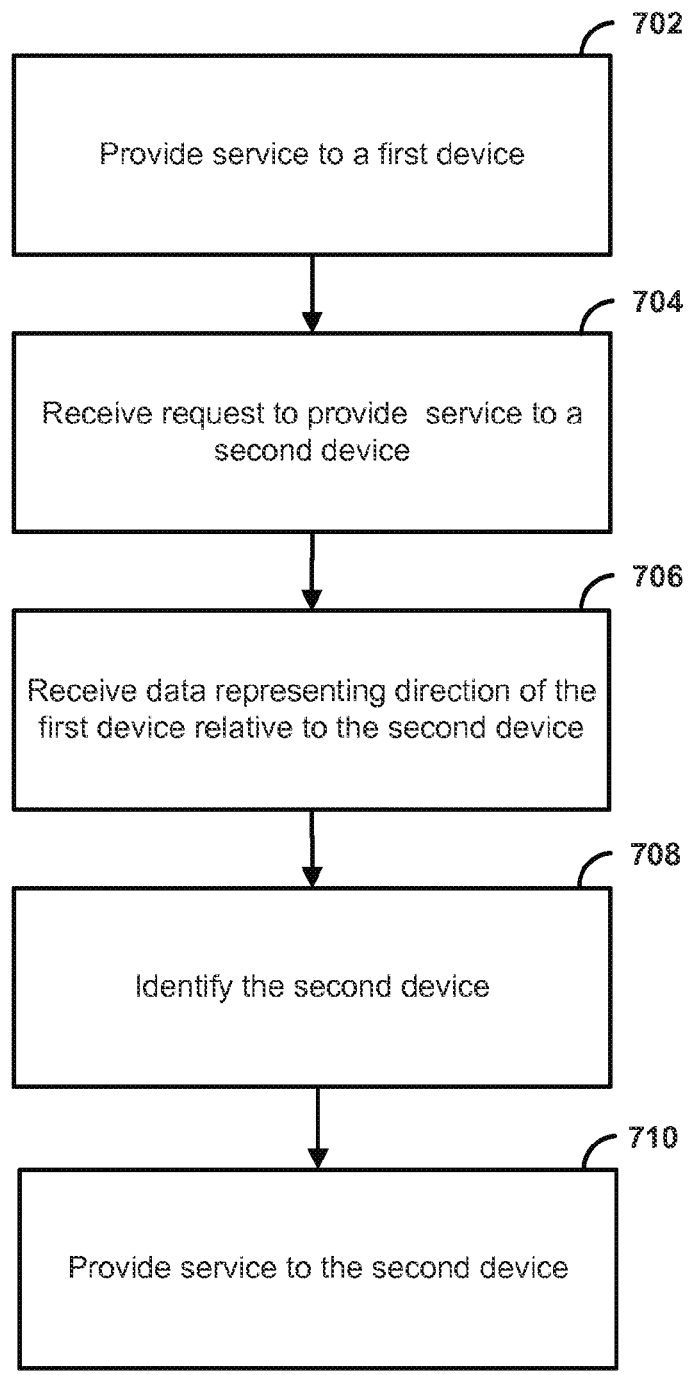
FIG. 7 is a flowchart illustrating another example method for service transfer.

FIG. 7 is a flowchart illustrating yet another example method for service transfer. At step 702, service can be provided to a first user device. In an aspect, the service can comprise a communication session, network access, video service, audio service, short message service, multimedia message service, and the like. In another aspect, the first user device can comprise a personal computer, a mobile device, a tablet device, a smart phone, a watch, glasses, a television, and the like. As an example, the computing device 104 can provide service to the first user device (e.g., user device 101).

At step 704, a request can be received from the first user device to provide or transfer the service to a second user device. As an example, the request can be received by the computing device 104. As another example, the request can be received by a plurality of second user devices. In an aspect, the request can be activated by a user of the first user device pointing the first user device at a second user device to which user wants the service transferred. The pointing can be achieved by moving the first user device in the direction of the second user device at certain speed. In an aspect, the request can be detected by the first user device receiving a signal from one or more motion or position sensors. The sensors can comprise one or more of a magnetometer, a gyroscope, an accelerometer, a radio transceiver, a global positioning system device, a compass, a light beam sensing system, and the like. In another aspect, the request can be received by the respective plurality of second user devices via a wired and/or wireless network using Wi-Fi, Bluetooth or any desired method or standard. In this scenario, a plurality of processors can be implemented in the plurality of second user devices to process the request received from the first user device.

At step 706, the data representing a direction or location of the first user device relative to the second user device can be determined or received. In an aspect, the direction of the second user device relative to the first user device can be received by the computing device 104 via a wired and/or wireless network using Wi-Fi, Bluetooth or any desired method or standard. As an example, the processor 132 of the first user device can receive a signal from one or more of a magnetometer, a gyroscope, an accelerometer, a radio transceiver, a global positioning system, a compass. The signal can indicate real-time position (e.g., GPS coordinates) of the first user device. In an aspect, the movement of the first user device can be calculated based on real-time position change (e.g., GPS coordinates change, distance and angle change with respect to a common base point) of the first user device. In an aspect, the processor 132 can calculate the real-time position change and thereby determine the location, positioning, and/or direction of the second user device relative to the first user device (e.g., user device 101). In an aspect, a speed of the movement can be determined by calculating the real-time position change. As such, both the direction and speed of the movement of the first user device can be received by the computing device 104.

In another aspect, data representing direction and/or location of the first user device with respect to a plurality of second user devices can be received by the respective plurality of second user devices via a wired and/or wireless network using Wi-Fi, Bluetooth or any desired method or standard. In this scenario, a plurality of processors can be implemented in the plurality of second user devices to process the data representing direction and/or location of the first user device with respect to the respective plurality of transferable second user devices. The data processed in the plurality of second user devices can be sent to a service provider (e.g., computing device 104).

In an aspect, a user can click a button on the first user device (e.g., user device 101) prior to initiating a movement. By clicking the button, the computing device 104 and/or the plurality of second user devices (e.g., user devices 101a, 101b, 101c and 101d) can be informed that the first user device intends a service transfer. The computing device 104 and/or the plurality of second user devices (e.g., user devices 101a, 101b, 101c and 101d) can be set to a listening status. The listening status can enable the computing device 104 and/or the plurality of second user devices (e.g., user devices 101a, 101b, 101c and 101d) to be ready to receive and/or process data representing direction and/or location of the first user device with respect to a plurality of second user devices. The listening status can prevent providing service to a second user device in cases where movement of the first user device is not intended for service transfer.

At step 708, the second user device can be identified. In an aspect, the second user device can be identified by the computing device 104. As an example, processor 134 of the computing device 104 can map the direction of movement of the first user device with respect to the position of other user devices stored in the service transfer database 128. In an aspect, the user device at the end or final direction of movement of the first user device can be identified as the second user device.

In an aspect, identifying the second user device can comprise receiving registration information for a first user device and a second user device, updating registration information for the first user device and the second user device to reflect a change in a position of the first user device with respect to the second user device, and accessing the registration information to determine the second user device.

In an aspect, the registration information can comprise position information (e.g., GPS coordinates, distance with respect to a common base point, angle with respect to a fixed common base point) and device identity (e.g., device identifier). In an aspect, the updated registration information can be received by the computing device 104 and stored in the service transfer database 128. Updated registration information can be accessed to determine the second user device. As an example, the processor 134 can access the updated registration information and map the direction of the movement of first user device with respect to the position of a second user device according to the update registration information. If the second user device is in the direction of the movement of the first user device, the second user device can be identified as the second user device for the service to be transferred.

As a specific example, identifying a second user device can comprise determining a relative signal strength indicator (RSSI) for each of a plurality of user devices. In an aspect, the plurality of user devices can comprise a first user device and a second user device, and the RSSI value of a first user device and a second user device can be received at the computing device 104. The RSSI value and angle with respect to a common base point (e.g., Wi-Fi router, a femtocell) can be updated in real time (e.g., via compasses in user devices) to reflect a change in a position of the first user device and the second user device. The updated RSSI value can be accessed by the processor 134 to determine the second user device.

At step 710, the service can be transferred or provided to the second user device. As an example, the computing device 104 can provide service to the identified second user device according to its device identity (e.g., device identifier 108). In an aspect, a service transfer request can be confirmed by a user of a first user device before the service can be provided to the second user device. This can prevent the movement of the first user device that is not intended for service transfer.

Figure 8:
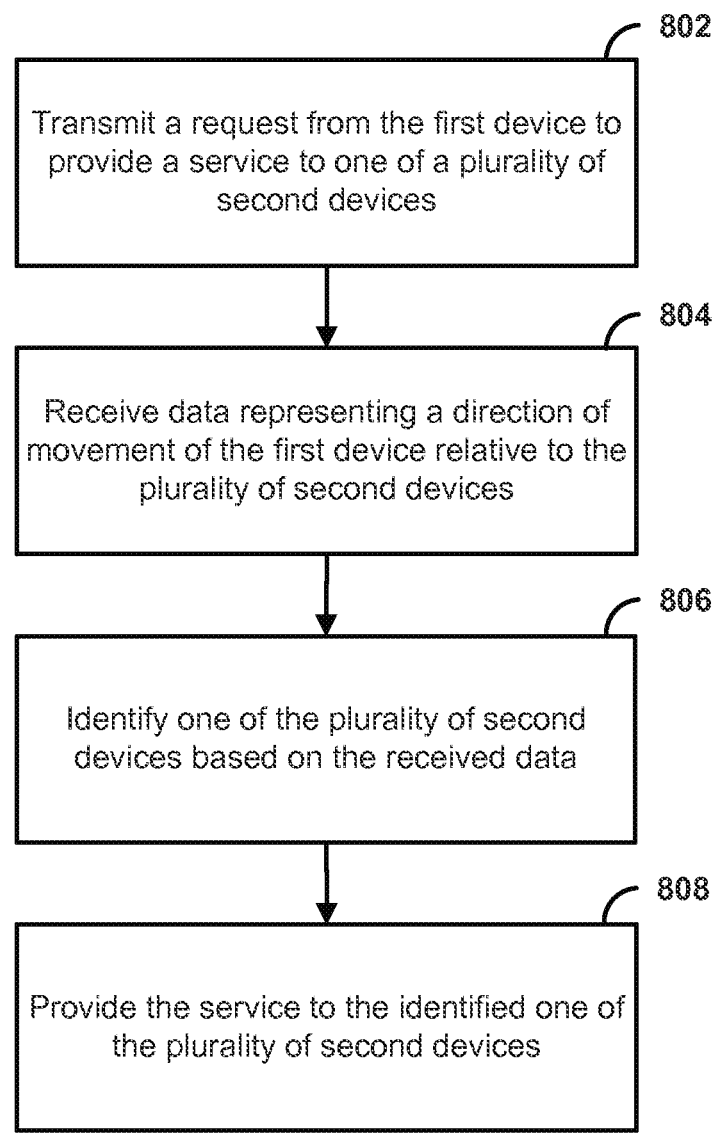
FIG. 8 is a flowchart illustrating another example method for service transfer.

FIG. 8 is a flowchart illustrating another example method for service transfer. At step 802, a request to provide a service to one or a plurality of second user device can be transmitted from a first user device. In an aspect, the service can comprise a communication session (e.g., a telephone call), network access, video service, audio service, short message service, multimedia message service, and the like. The first user device can comprise a personal computer, a mobile device, a television, a tablet device, a smart phone, a watch, glasses, or other portable device. As an example, the request can be activated by a user of the first user device pointing the first user device at a second user device to which user wants the service transferred. In an aspect, data representing direction and/or position change of the first user device can be transmitted to the plurality of second user devices during the movement of the first user device. For example, the request can comprise the direction of the movement of the first user device. In an aspect, the request can further comprise the speed of the movement of the first user device.

At step 804, data representing a direction of movement of the first user device relative to the plurality of second user devices can be received. As an example, the data representing position and movement of the first user device can be transmitted to a plurality of second user devices. The first user device and the plurality of second user devices can be visible to a common network. In an aspect, a processor implemented in each of the plurality of second user devices can be configured to process data representing direction and/or position change of the first user device relative to the respective plurality of second user devices. The processed data can be transmitted to the first user device.

At step 806, one of the plurality of second user devices can be identified based on the received data. In an aspect, a processor in the first user device can be configured to map the direction of movement of the first user device with respect to the position of the plurality of second user devices. In an aspect, the user device at the end or final direction of movement of the first user device can be identified as the second user device.

In an aspect, identifying one of the plurality of second user devices can comprise the first user device receiving registration information from the plurality of second user devices. As an example, the registration information can comprise position information (e.g., GPS coordinates, distance with respect to a common base point, angle with respect to a fixed common base point) and device identity (e.g., device identifier). In an aspect, registration information for the first user device and the plurality of second user devices can be updated to reflect a change in a position of the first user device with respect to the plurality of second user devices. The first user device can access the registration information to determine a second user device. As an example, a processor in the first user device can access the updated registration information and map the direction of the movement of the first user device with respect to the position of the plurality of second user devices according to the update registration information. If a second user device is in the direction of the movement of the first user device, the second user device can be identified as the second user device for the service to be transferred or provided.

As a specific example, identifying one or the plurality of second user devices can comprise determining a relative signal strength indicator (RSSI) for the first user device and each of the plurality of second user devices. In an aspect, the RSSI value of the first user device and the plurality of second user devices can be received at the first user device. The RSSI value and angle with respect to a common base point (e.g., Wi-Fi router, a femtocell) can be updated in real time (e.g., via a compass in the devices) to reflect a change in a position of the first user device relative to the plurality of second user devices. The updated RSSI value and angle with respect to the common base point can be accessed by a processor of the first user device to determine one of the plurality of second user devices.

At step 808, the service can be provided or transferred to the identified one of the plurality of second devices. As an example, the service can be provided to the identified second user device according to its device identity (e.g., device identifier 108). In an aspect, a service transfer request can be confirmed by a user of a first user device before the service can be provided or transferred to the identified second user device. This can prevent the movement of the first user device that is not intended for service transfer.

Figure 9:
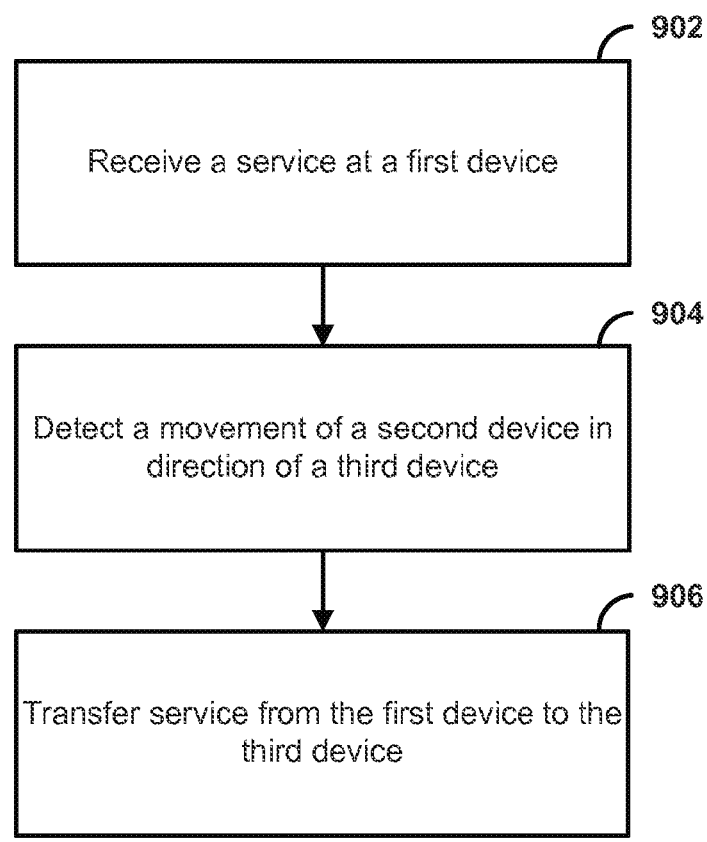
FIG. 9 is a flowchart illustrating another example method for service transfer.

FIG. 9 is a flowchart illustrating another example method for service transfer. At step 902, a service can be received at a first user device. In an aspect, the service can comprise a communication session (e.g., a telephone call), network access, video service, audio service, short message service, multimedia message service, and the like. The first user device can comprise a personal computer, a mobile device, a television, a tablet device, a smart phone, a watch, glasses, or other portable device. In an aspect, the service can be received from the computing device 104 at the first user device (e.g., user device 101*a*).

At step 904, a movement of a second user device in direction of a third user device can be detected. In an aspect, a user of a second user device can point the second user device (e.g., user device 101) at a third user device (e.g., user device 101b) to which the user wants the service provided to the first device (e.g., user device 101a) to be transferred. Pointing can be achieved by moving the second user device (e.g., user device 101) to the direction of the third user device (e.g., user device 101b) at certain speed. In an aspect, one or more motion or position sensors implemented in the second user device can be used to detect the movement of the second user device. As an example, detecting a movement of the second user device can comprise receiving a signal from one or more of a magnetometer, a gyroscope, an accelerometer, a radio transceiver, and a global positioning system, a light system such as infrared (IR), implemented in the second user device.

In an aspect, direction of the movement of the second user device can be determined. As an example, the direction of the movement of the second user device can be calculated based on real-time GPS coordinates change or any other relative positioning system. As another example, the direction of the movement of the second user device can be calculated based on real-time angle change and distance change relative to a common network access point (e.g., a Wi-Fi router, a femtocell). In an aspect, the real-time position information can be sent to a processor of the second user device and/or a processor of a computing device (e.g., computing device 104). The processor of the second user device and/or a processor of the computing device (e.g., computing device 104) can calculate the real-time position change and thereby determine the direction of the movement of the second user device with respect to other user devices in a network. In an aspect, the position (e.g., start position, end position) and movement information (e.g., position change, speed, direction) of the second user device can be shared with other user devices (e.g., user devices 101a, 101b, 101c, and 101d) and computing device 104 via a wired and/or wireless network using Wi-Fi, Bluetooth or any desired method or standard. In an aspect, the user device in the resulting or final direction of movement can be identified as target device for service transfer. As an example, the third device (e.g., user device 101b) can be determined to be in the resulting or final direction of movement of the second user device. As such, information (e.g., device identifier 108, address element 110, etc.) of the third device (e.g., 101b) can be shared with other user devices (e.g., user devices 101, 101a, 101c, and 101d) and/or the computing device 104.

At step 906, service can be transferred from the first device to the third device. As an example, the computing device 104 can provide service to the third user device (e.g., user device 101b) according to a device identifier (e.g., device identifier 108, address element 110) of the third user device. In another aspect, the computing device 104 can stop providing the service to the first device (e.g., user device 101a) once the service is provided to the third device (e.g., user device 101b). In an aspect, a service transfer request can be confirmed by a user of a second user device (e.g., user device 101) before the service can be provided to the third user device (e.g., user device 101b). This can prevent the movement of the second user device (e.g., user device 101) that is not intended for service transfer.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a first device, a multimedia service from a second device;
   updating registration information for at least one of the first device and a third device to reflect a change in a position of at least one of the first device and the third device;
   detecting, by a sensor of the first device, a movement of the first device;
   determining a direction of the movement;
   determining that the movement indicates an intent to transfer the multimedia service from the first device to the third device based on the registration information and the direction of the movement; and
   requesting the multimedia service be provided by the second device to the third device in response to the detecting the movement of the first device.

2. The method of claim 1, wherein the multimedia service comprises one or more of: a communication session, network access, a video service, an audio service, a short message service, or a multimedia message service.

3. The method of claim 1, wherein detecting, by the sensor of the first device, the movement of the first device comprises receiving a signal from one or more of a magnetometer, a gyroscope, an accelerometer, a radio transceiver, a global positioning system, or a compass.

4. The method of claim 1, wherein determining the direction of the movement comprises receiving a signal from one or more of a magnetometer, a gyroscope, an accelerometer, a radio transceiver, a global positioning system, or a compass.

5. The method of claim 1, wherein requesting the multimedia service be provided by the second device to the third device comprises providing the direction of the movement to the second device.

6. The method of claim 1, wherein determining that the movement indicates the intent to transfer the multimedia service from the first device to the third device based on the registration information and the direction of the movement comprises determining that the third device is located in the direction of the movement based on the registration information.

7. The method of claim 6, wherein determining that the movement indicates the intent to transfer the multimedia service from the first device to the third device based on the registration information and the direction of the movement comprises identifying the third device.

8. The method of claim 1, further comprising determining a speed of the movement.

9. The method of claim 8, wherein determining that the movement indicates the intent to transfer the multimedia service from the first device to the third device based on the registration information and the direction of the movement comprises providing the speed of the movement to the second device.

10. The method of claim 8, wherein determining that the movement indicates the intent to transfer the multimedia service from the first device to the third device on the registration information and the direction of the movement comprises determining the intent to transfer based on the speed of the movement and determining the third device based on the direction of the movement.

11. The method of claim 1, wherein the registration information comprises a position associated with an identifier of the first device and a position associated with an identifier of the third device.

12. A method comprising:
receiving registration information for a first device and a second device;
updating the registration information for at least one of the first device and the second device to reflect a change in a position of at least one of the first device and the second device;
providing a multimedia service to the first device;
receiving a request from the first device to transfer the multimedia service to a target device;
receiving data representing a direction of a movement of the first device relative to the target device;
identifying the second device as the target device based on the registration information and the data representing the direction of the movement of the first device; and
providing the multimedia service to the second device in response to receiving the request from the first device.

13. The method of claim 12, wherein the multimedia service is one or more of: a communication session, network access, a video service, an audio service, a short message service, or a multimedia message service.

14. The method of claim 12, further comprising receiving a speed of the movement of the first device.

15. The method of claim 14, wherein identifying the second device as the target device comprises determining the second device based on the direction and the speed of the movement.

16. The method of claim 12, wherein identifying the second device as the target device comprises:
determining a relative signal strength indicator for each of a plurality of devices, wherein the plurality of devices comprises the first device and the second device; and
utilizing the relative signal strength indicator of the second device to identify the second device as the target device.

17. The method of claim 12, wherein the registration information comprises a position associated with an identifier of the first device and a position associated with an identifier of the second device.

18. A method comprising:
transmitting, to a plurality of second devices, a request from a first device to provide a multimedia service to one of the plurality of second devices;
receiving, from the plurality of second devices, data representing at least a direction of a movement of the first device relative to the plurality of second devices;
updating registration information for the first device and the plurality of second devices to reflect a change in a position of the first device relative to one or more of the plurality of second devices based on the data representing the direction of the movement of the first device;
identifying the one of the plurality of second devices based on the registration information and the data representing the direction of the movement of the first device; and
providing a request to transfer the multimedia service to the identified one of the plurality of second devices in response to the request from the first device.

19. The method of claim 18, wherein the multimedia service is one or more of: a communication session, network access, a video service, an audio service, a short message service, or a multimedia message service.

20. The method of claim 18, wherein identifying the one of the plurality of second devices comprises:
determining a relative signal strength indicator for the first device and each of the plurality of second devices; and
comparing the relative signal strength indicator of the first device and each of the plurality of second devices to identify the one of the plurality of second devices.

* * * * *